United States Patent [19]

Bromberg

[11] 3,966,152
[45] June 29, 1976

[54] ELECTRICAL RECEPTACLE
[75] Inventor: Menashe Bromberg, West Orange, N.J.
[73] Assignee: Thomas & Betts Corporation, Elizabeth, N.J.
[22] Filed: Apr. 14, 1975
[21] Appl. No.: 567,540

Related U.S. Application Data
[62] Division of Ser. No. 512,414, Oct. 7, 1974.

[52] U.S. Cl. ............................. 248/27 R; 220/3.9
[51] Int. Cl.² .................... H02G 3/08; H02G 3/18; H02G 3/12
[58] Field of Search ............ 248/205 R, 27, DIG. 6; 220/3.9; 174/58

[56] References Cited
UNITED STATES PATENTS
2,401,948   6/1946   Loy ............................... 248/DIG. 6

Primary Examiner—J. Franklin Foss
Attorney, Agent, or Firm—David Teschner; Jesse Woldman

[57] ABSTRACT

An electrical receptacle comprises an integrally molded body member and flanged face plate formed preferably as a duplex receptacle for the receipt of conventional two and three wire electrial plugs. The interior of the body member comprises a series of selectively positioned contact supports for engagement with novel contact means suitably aligned therewithin. A mating cover member designed to latch with the body member is provided with inwardly directed projections selectiely aligned in a series of rows to provide discrete cradles for each of the conductors of a multiconductor electrical cable to be attached to the receptacle. The receptacle is provided with mounting pawls rotatably and axially replaceable for contact with the inner surface of a support structure and is operable from the front surface of the receptacle which comprises in one embodiment, a pair of pawl supporting screws the head portions of which are accessible from the front surface of the face plate. The electrical contacts are formed from a single strip of preferably highly conductive metallic material configured to selectively receive the conventional current carrying and the ground conductors of a conventional multiconductor non-metallic sheathed electrical cable. Each of the contacts is selectively formed to provide a U-shaped portion selectively slotted to provide highly effective insulation severing and conductor engaging independently deflectable finger portions designed to provide a rapid, secure, and permanent connection to the respective cable conductors. The contacts are further provided with flattened looped portions arranged to resiliently engage the contacts of an electrial plug inserted within the receptacle. Juxtaposed receptacles may be mounted in a frame and secured to a suitably apertured support member to provide a compact ganged assembly of increased capacity.

2 Claims, 33 Drawing Figures

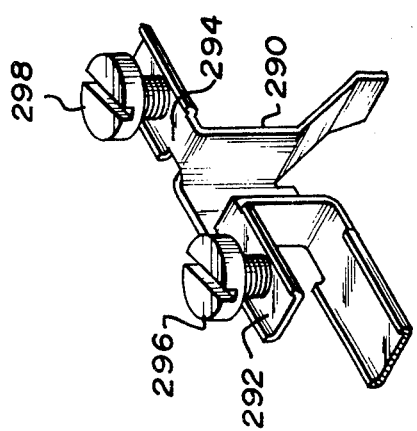
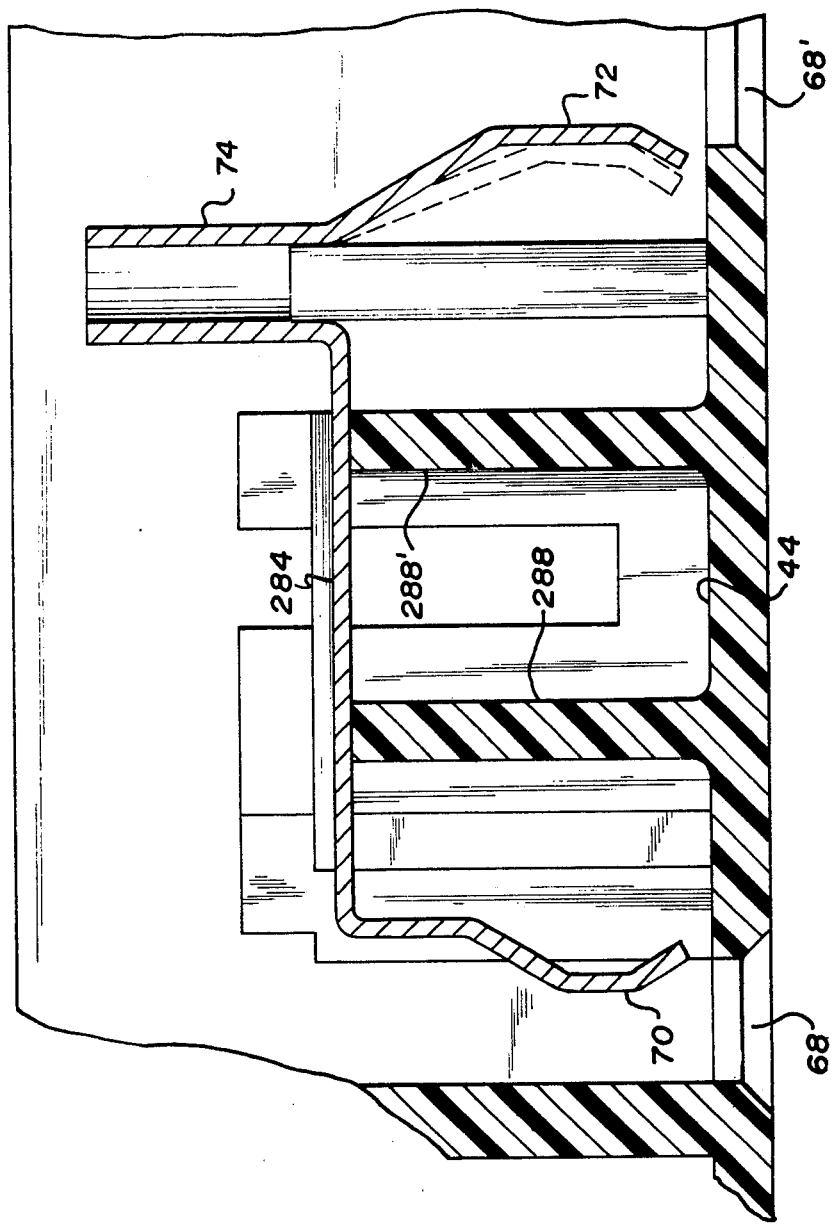

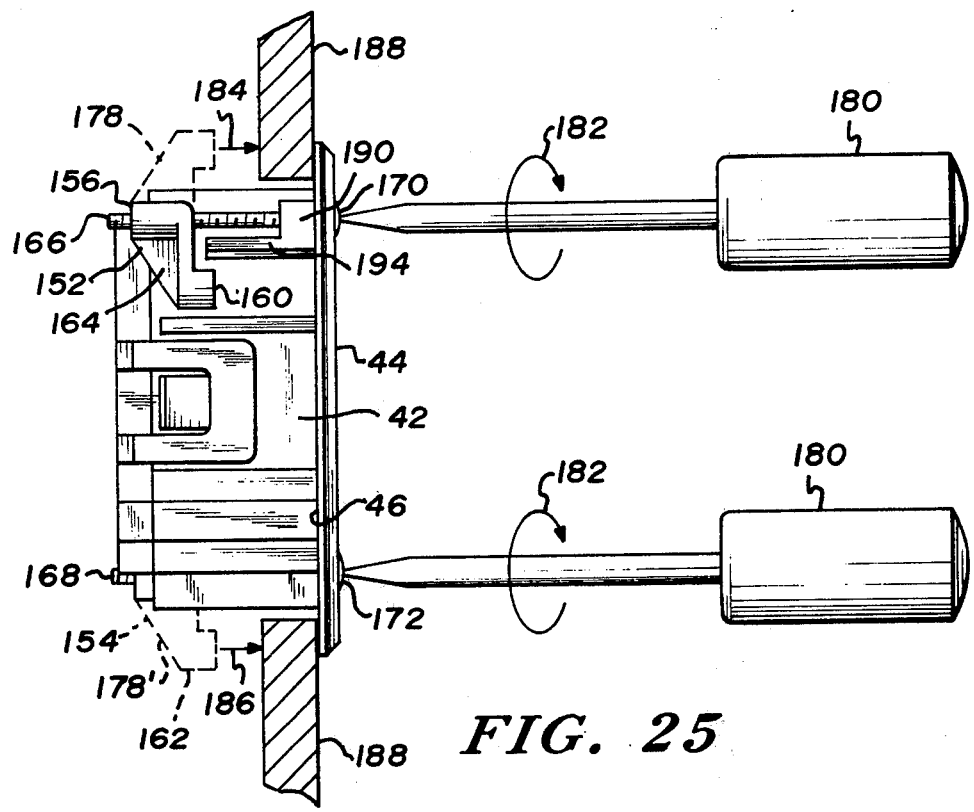
FIG. 25
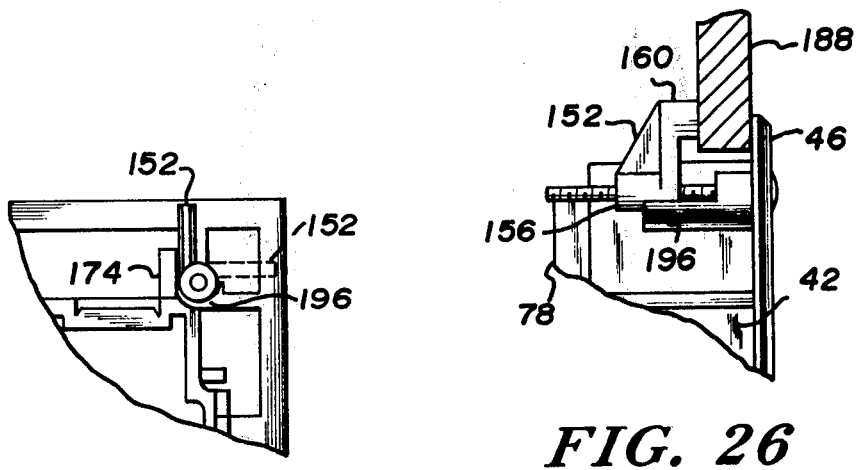
FIG. 27
FIG. 26

ELECTRICAL RECEPTACLE

BACKGROUND OF THE INVENTION

This is a division of application Ser. No. 512,414, filed Oct. 7, 1974.

FIELD OF THE INVENTION

The invention is directed to the field of wiring devices and principally to an electrical receptacle adapted to receive conventional two and three prong electrical plugs.

DESCRIPTION OF THE PRIOR ART

The more common form of electrical receptacle well known in the art comprises generally a pair of plug receiving outlets more commonly described as a duplex receptacle comprising a plastic body member containing electrical contacts and adapted to mate with either a two or three prong electrical plugs of either the 120 volt or 220 volt variety comprising, respectively, parallel or offset blade elements. The recepacles are generally provided with screw terminals on either side thereof adapted to receive the bared ends of the individual conductors of a multiconductor non-sheathed electrical cable. Such prior art receptacles are further generally provided with mounting ears to which are loosely fastened assembly screws for mounting the receptacle to a metallic box previously installed within an opening in a wall or like support member. A separate face plate is thereafter required to be fastened to the front of the receptacle for asthetic and safety purposes. Although there have been some improvements made in recent years with respect to the manner of attaching the cable conductors to the receptacle, the time, expense, and inconvenience associated with assembling the metallic box, electrical receptacle, and face plate to one another to provide a complete unit has undergone little appreciable change and respresents a burdensome, time-consuming, and relatively expensive operation wherein the user is required to sever the cable, strip back the installation from a portion thereof and individually connect the conductors to an associated terminal within the electrical receptacle after feeding the cable through an aperture in the receptacle supporting junction box. The user is faced with an additional problem of having to maintain a stock of face plates which are generally supplied separately from the receptacle and which may be readily lost or misplaced among the proliferation of materials generally found at a construction site which often represents the usually environment for the installation of such receptacles. A further disadvantage of the separate assembly heretofore described is the requirement that the receptacle supporting junction box be properly oriented both vertically and horizontally within the wall or supporting member to avoid having the face plate secured thereto at an oblique angle since only minor adjustment is possible between the axis of the junction box and the axis of the face plate after installation. The assembler is presented with a further difficulty in having to provide within the junction box a given length of stripped cable to permit manipulation of the receptacle for subsequent rewiring or replacement and which must be looped and stored within the junction box after the assembly is completed which, in the event two or more cables are brought into the junction box, results in a multiplicity off connector leads therewithin all looped about in random fashion and interfering with the reassembly of the electrical receptacle to the junction box during a subsequent wiring operation.

SUMMARY OF THE INVENTION

The invention overcomes the limitations and difficulties noted above with respect to prior art devices by providing a preferably integrally molded plastic electrical receptacle of unitary construction having self-contained mounting means and a releasably latchable cover member to provide an assembly which is simpler, less expensive, more reliable, and more convenient than such prior art devices. The receptacle is molded preferably from a relatively rigid electrically insulating plastic material and comprises a body member defined by a series of interconnected upstanding walls to provide a partially enclosed cable receiving cavity. Molded or formed integrally with one end of the cavity is a base portion having a generally planar flanged portion extending outwardly from the periphery of the body member, the front surface of the base portion being suitably apertured to provide a series of selectived spaced openings adapted to receive the blades of an electrical plug. Located adjacent the rear surface of the flanged portion of the base member at opposite corners of the outer periphery of the body member are a pair of mounting pawls each supported on a rotatable member extending through the hub portion of each pawl and accessible from the front of the base portion to deploy a respective pawl and permit the receptacle to be mounted within a suitably apertured opening in a wall or other support member. The cable receiving cavity is provided with a series of upstanding electrical contact supports arranged in a predetermined pattern to provide support for electrical contacts having tab receiving portions adapted to mate with the blades of an electrical plug inserted through the openings in the base portion. The electrical contacts are readily manufactured preferably from a single strip of highly conductive metallic material and are selectively formed to provide an insulation severing and conductor engaging slotted portion having independently deflectable finger portions which are arranged to sever the installation and engage the conductive portion of a respective insulated conductor forcibly urged into the slotted portion of the contact. To complete the assembly there is provided a cover member also constructed preferably of a rigid electrically insulating plastic material in a generally flat rectangular shape and comprising a series of projections extending outwardly from the inner surface thereof and aligned in generally longitudinally extending parallel rows, each projection having a generally V-shaped bifurcated free end adapted to provide a cradle for the respective conductors of an electrical cable. The cover member is releasably latchable to the body member of the receptacle by the employment of latching means which may comprise a pair of deflectable arms extending from opposing sides of the cover member, each arm having an opening adapted to coincide with a selectively located protrusion on the outer surface of the body member when the cover member is seated firmly against the open end thereof. To establish a particular orientation of the cover member on the body member, where desired, the width of the latching members may be differently proportioned and the sidewalls of the body member provided with corresponding pairs of upstanding parallel ribs, providing selectively spaced channels each coinciding with a respective latch member. A plurality of such electrical receptacles may be installed in a juxtaposed arrangement by the use of a stepped frame arranged to provide a seat for the flanged portion of each of the receptacles. The framed assembly may be mounted within a suitable opening in a wall or other support structure by the deployment of the mounting pawls of each receptacle in a manner essentially similar to that used to mount a single receptacle to such support. It is therefore an object of this invention to provide an improved electrical receptacle.

It is a further object of this invention to provide an electrical receptacle of unitary construction.

It is another object of this invention to provide an improved wiring device which simplifies the installation thereof to a supporting structure.

It is another object of this invention to provide an electrically insulated totally enclosed electrical receptacle of unitary construction having self-contained mounting means.

It is still another object of this invention to provide a means for rapidly electrically interconnecting the insulated conductors of an electrical cable to the contacts of an electrical receptacle.

It is yet a further object of this invention to provide an enclosed electrically insulated electrical receptacle of unitary construction having interiorly disposed electrical contacts arranged to be electrically connected simultaneously to the individual conductors of an insulated electrical cable.

It is still a further object of this invention to provide an electrical receptacle having novel mounting means deployable from the front of the receptacle to permit the rapid assembly and disassembly of the entire unit from a supporting wall or the like.

It is still a further object of this invention to provide a novel electrical receptacle contact designed to eliminate the need for severing the insulation from an insulated conductor to electrically join the conductor to the contact.

It is yet a further object of this invention to provide an electrical receptacle contact arranged to independently engage two or more electrical conductors of either the same or differing diameters.

It is still a further object of this invention to provide an electrical receptacle of unitary construction in which the cover member and body member thereof function cooperatively to provide novel means for rapidly electrically interconnecting the individual conductors of an electrical cable to electrical contacts situated within the receptacle.

Other objects and features will be pointed out in the following description and claims and illustrated in the accompanying drawings, which disclose, by way of example, the principle of the invention and the best modes contemplated for carrying it out.

BRIEF DESCRIPTION OF THE DRAWINGS

In the Drawings:

FIG. 22 is a fragmentary front elevational view, in section, showing the ground conductor support means of the device of FIG. 1.

FIG. 23 is a fragmentary perspective view, partly in section, of a further embodiment of a ground conductor contact means for an electrical receptacle constructed in accordance with the concepts of the invention.

FIG. 25 is a side elevational view, similar to FIG. 1, showing the manner in which the mounting means thereof are deployed to mount the device to a supporting structure.

FIG. 26 is a fragmentary side elevational view, partly in section, showing engagement of the mounting means of the device of FIG. 1 to an adjacent wall structure.

FIG. 27 is a fragmentary rear elevational view, showing the mounting means and associated structure of the device of FIG. 1.

Similar elements are given similar reference characters in each of the respective drawings.

DESCRIPTION OF THE PREFERRED EMBODIMENTS

Figure 1:
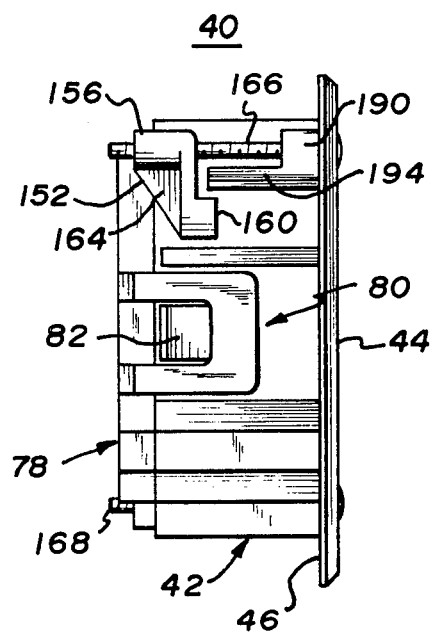
FIG. 1 is a side elevational view of an electrical receptacle constructed in accordance with the concepts of the invention.
Figure 2:
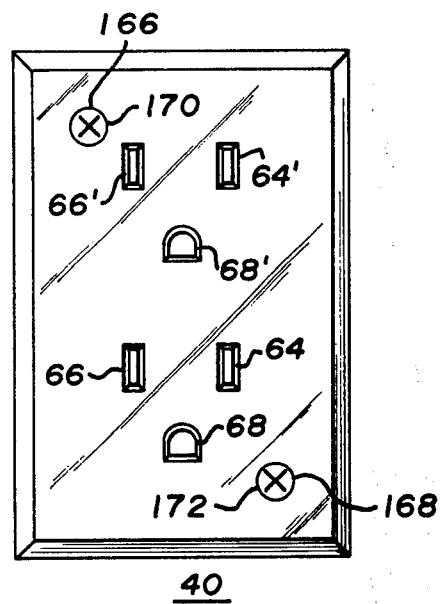
FIG. 2 is a front elevational view of the device of FIG. 1.
Figure 3:
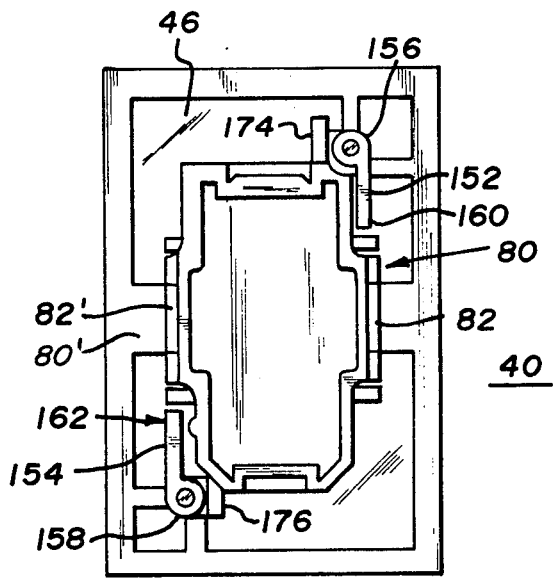
FIG. 3 is a rear elevational view of the device of FIG. 1.
Figure 4:
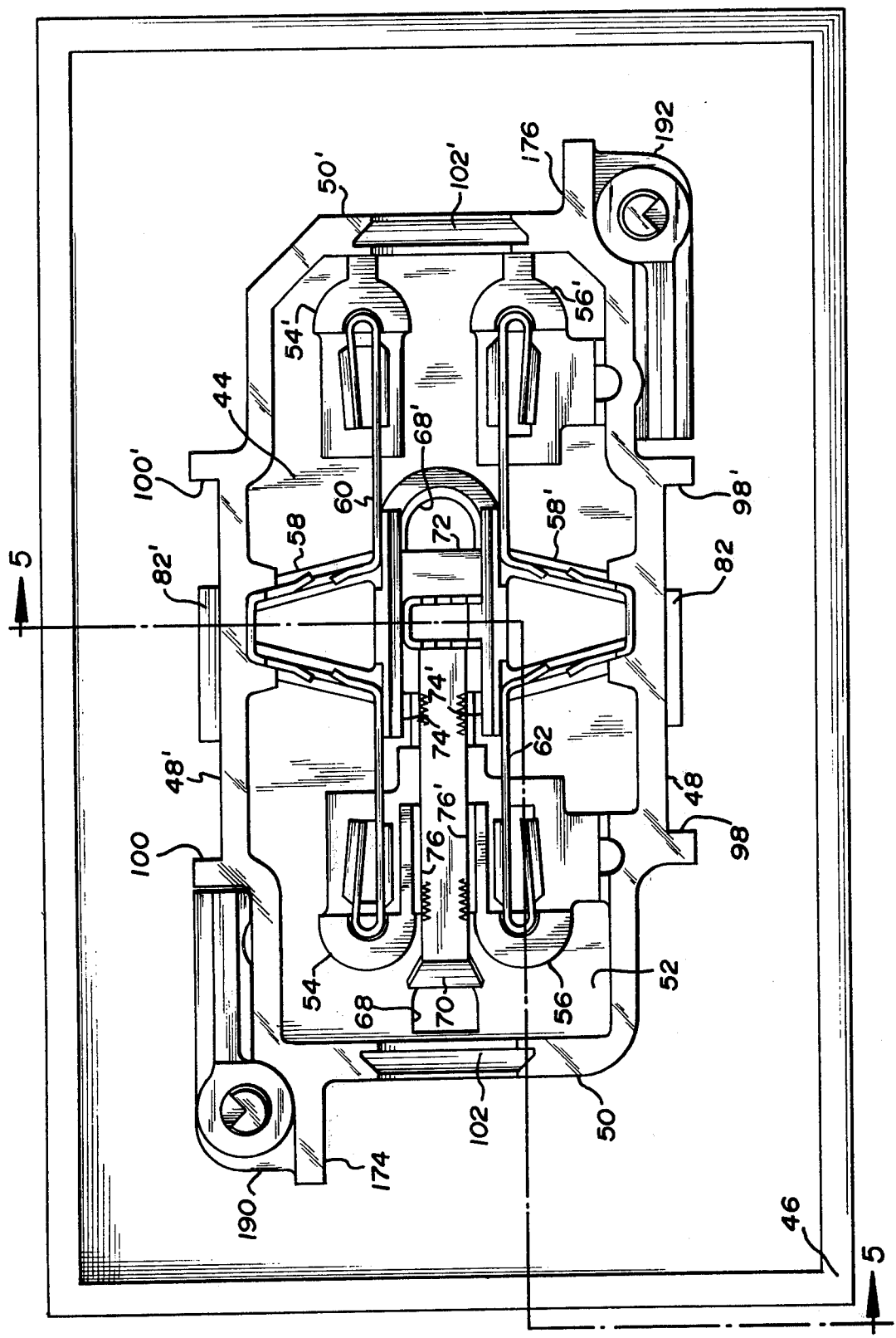
FIG. 4 is a top plan view of the body member of the device of FIG. 1.
Figure 5:
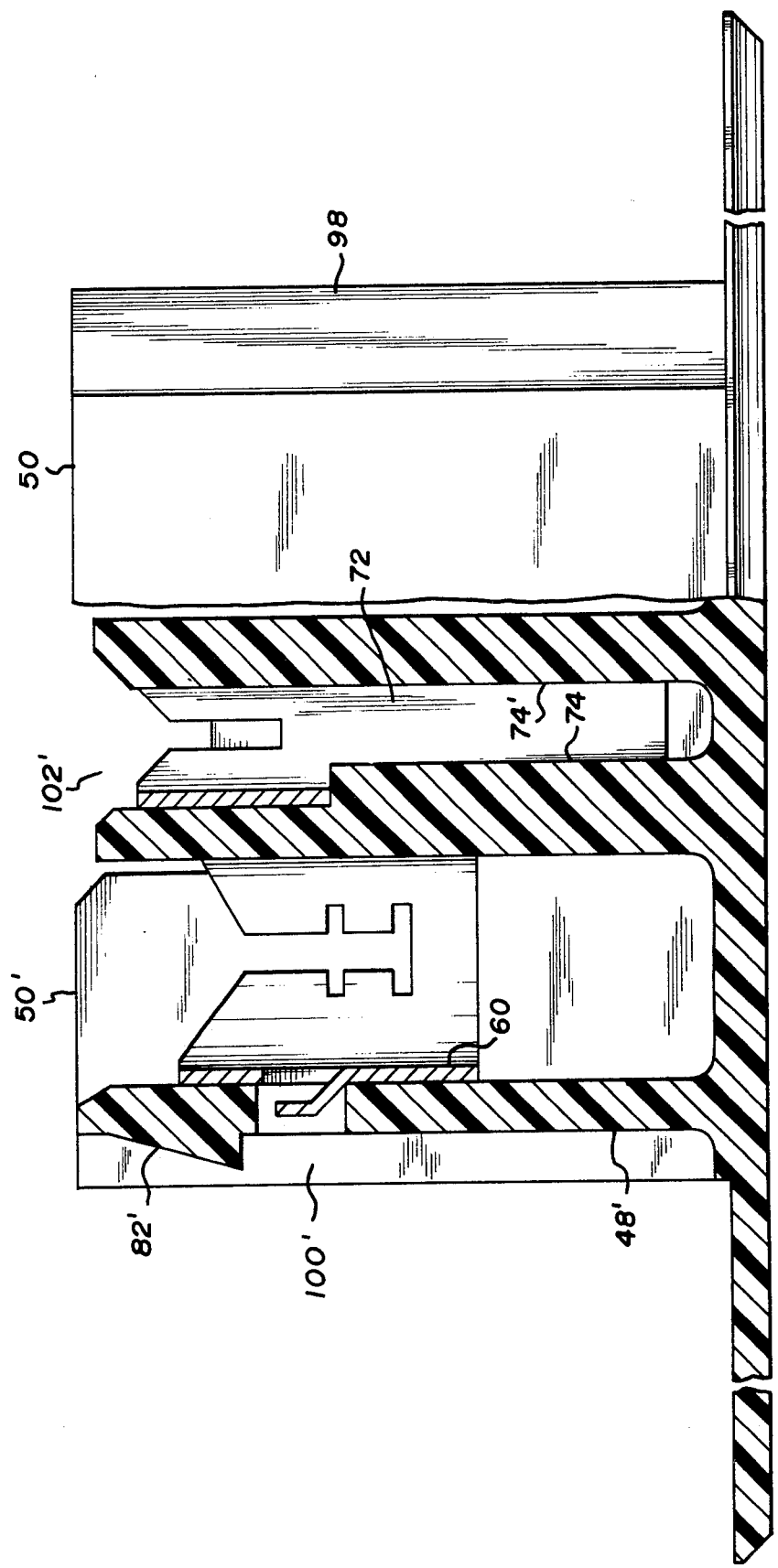
FIG. 5 is a side elevational view, partly in section, taken along the line 5—5 of FIG. 4.
Figure 8:
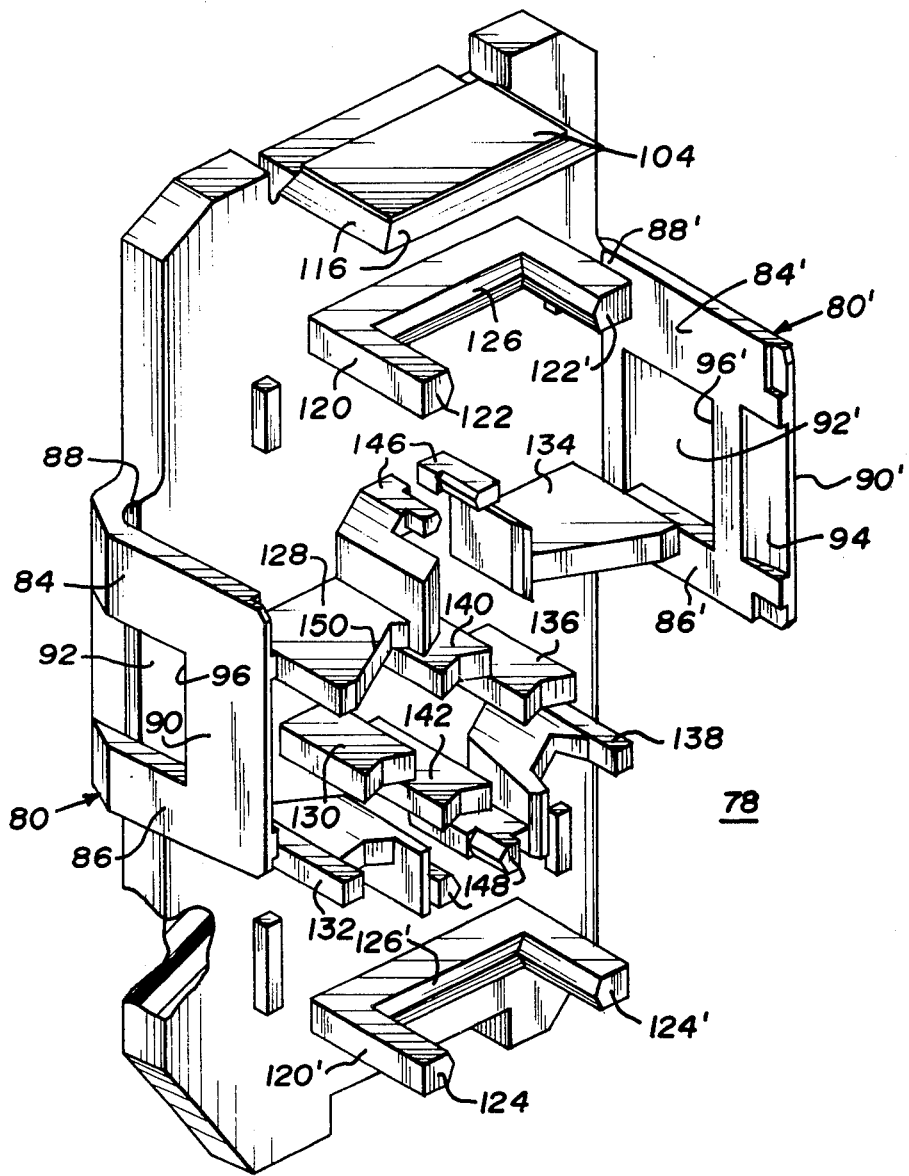
FIG. 8 is a perspective view, partly in section, of the cover member of the device of FIG. 1.
Figure 9:
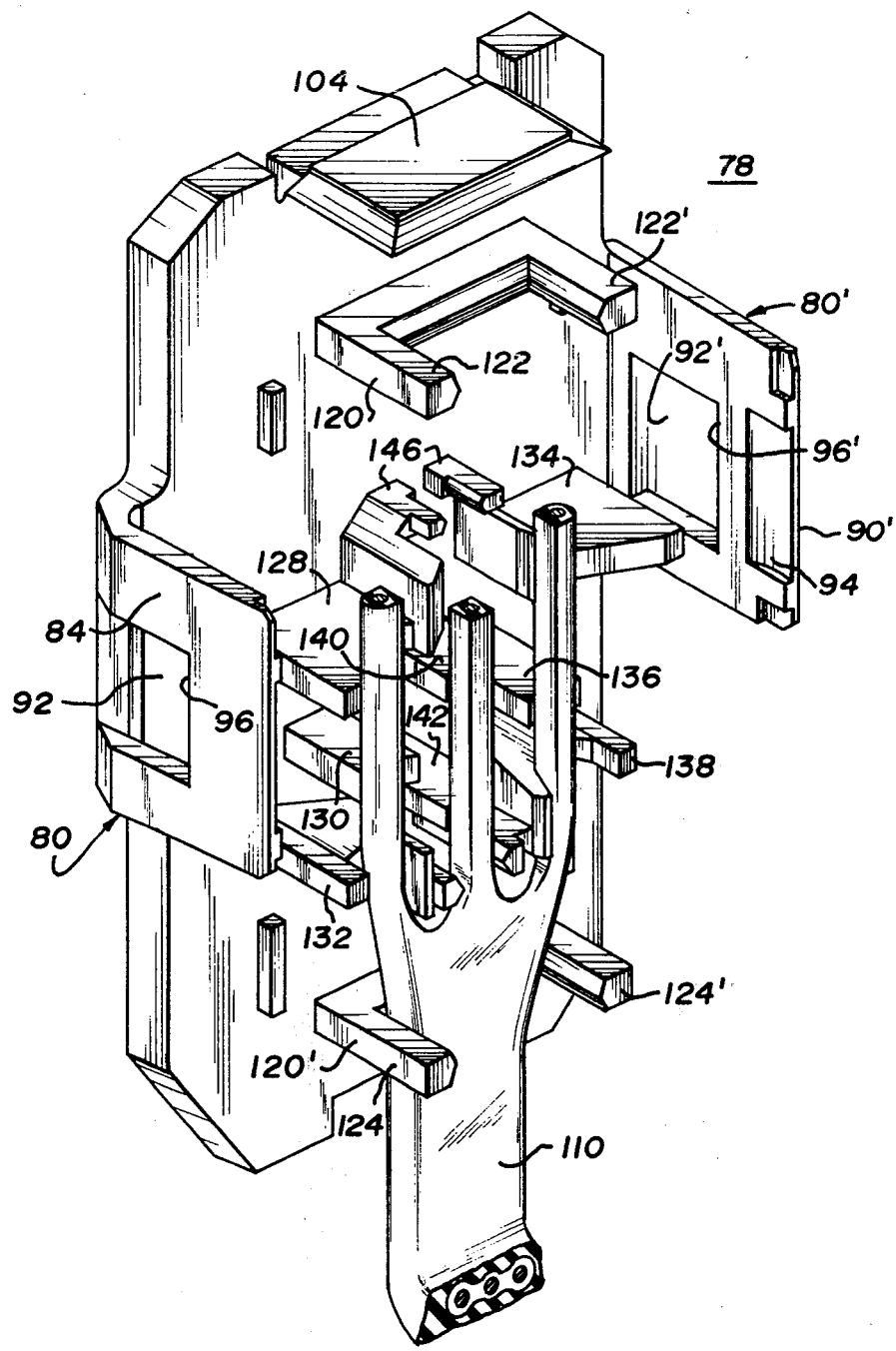
FIG. 9 is a perspective view, similar to FIG. 8, showing the terminating ends of the conductors of a multiconductor electrical cable cradled in the cover member.
Figure 10:
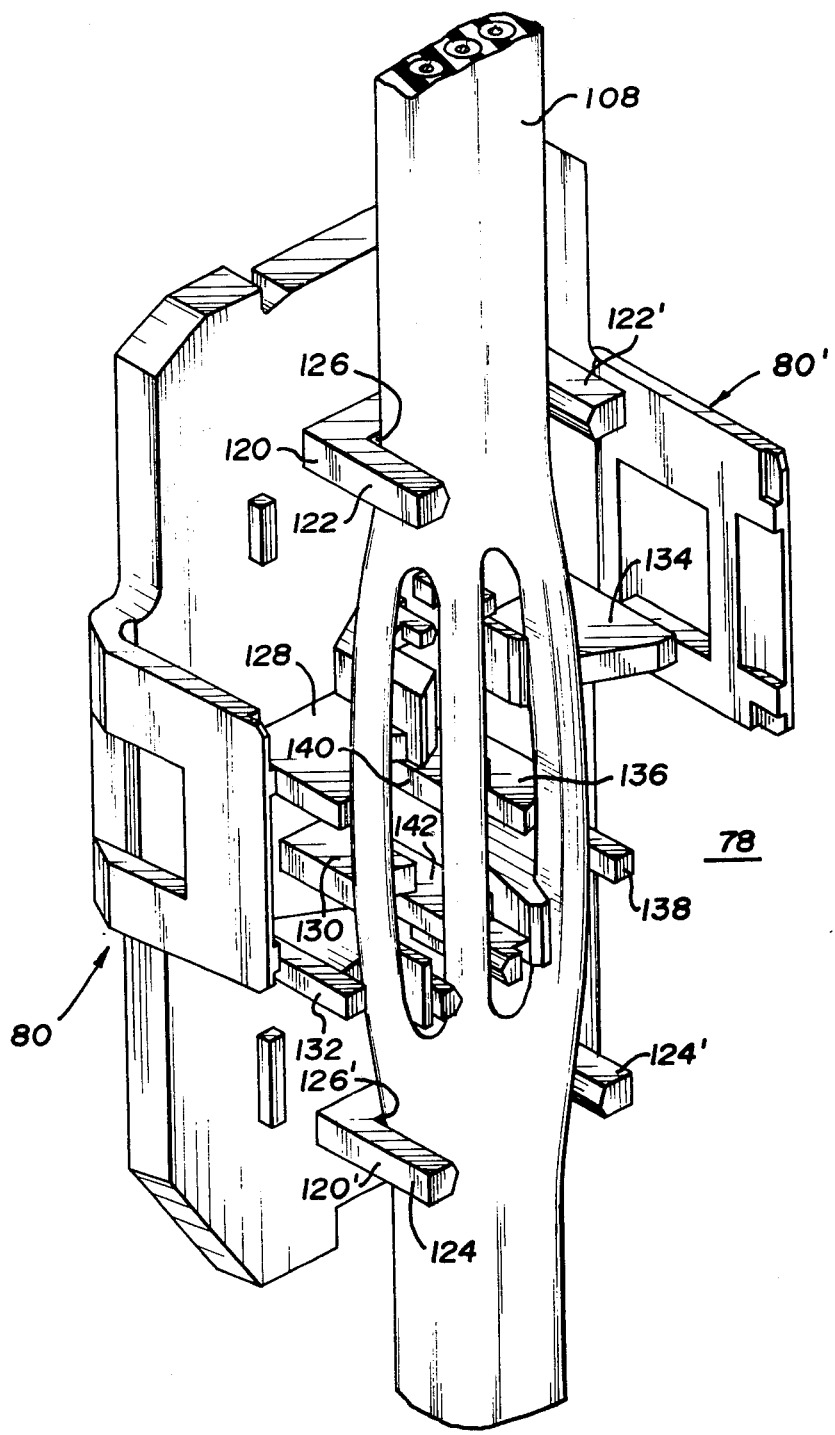
FIG. 10 is a perspective view, similar to FIG. 8, showing an intermediate portion of the conductors of a multiconductor cable cradled in the cover member.
Figure 11:
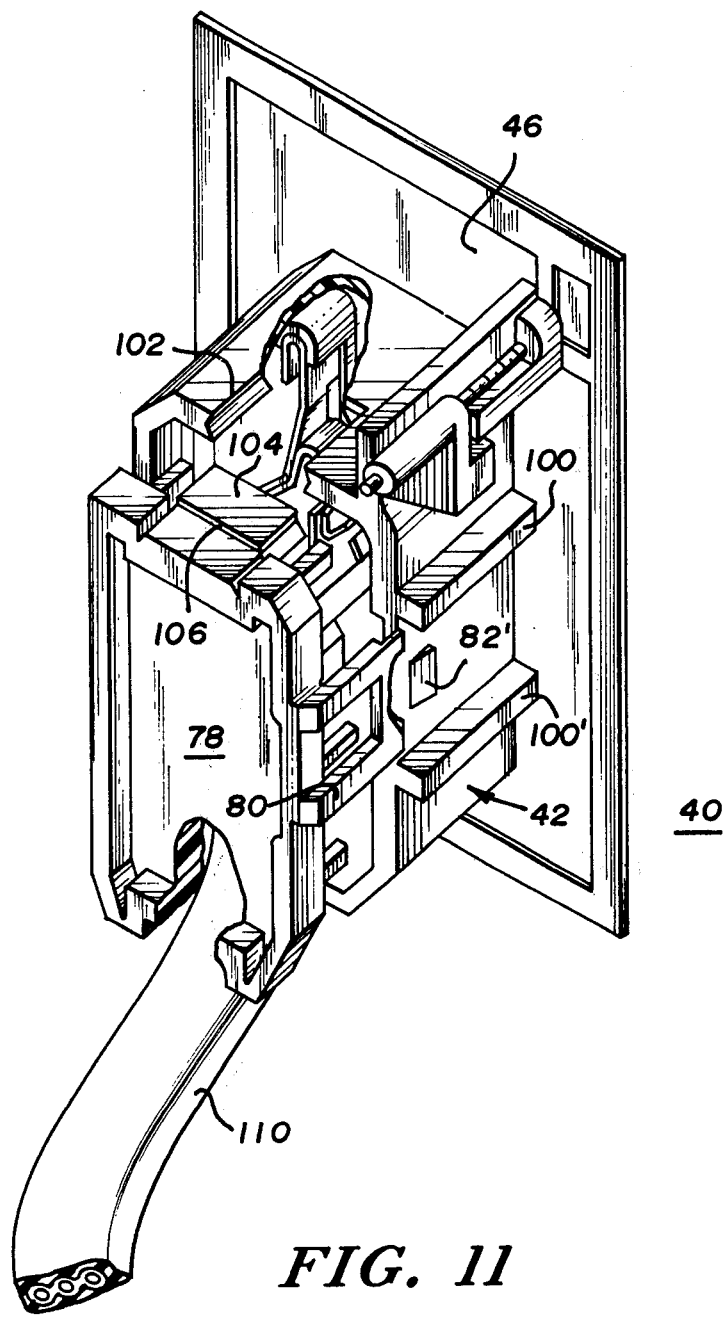
FIG. 11 is a perspective view, partly cut away and partly in section, of the device of FIG. 1 showing the manner of connecting an electrical multiconductor cable thereto.
Figure 12:
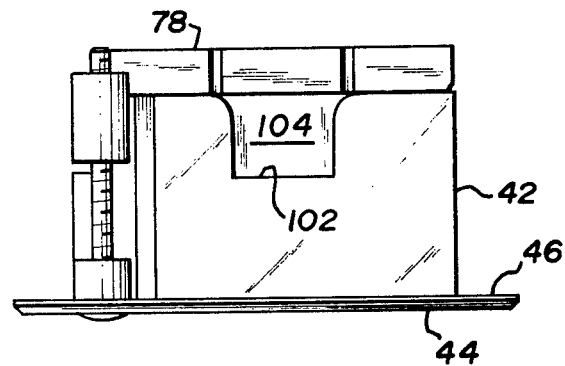
FIG. 12 is a top plan view of the device of FIG. 1.
Figure 13:
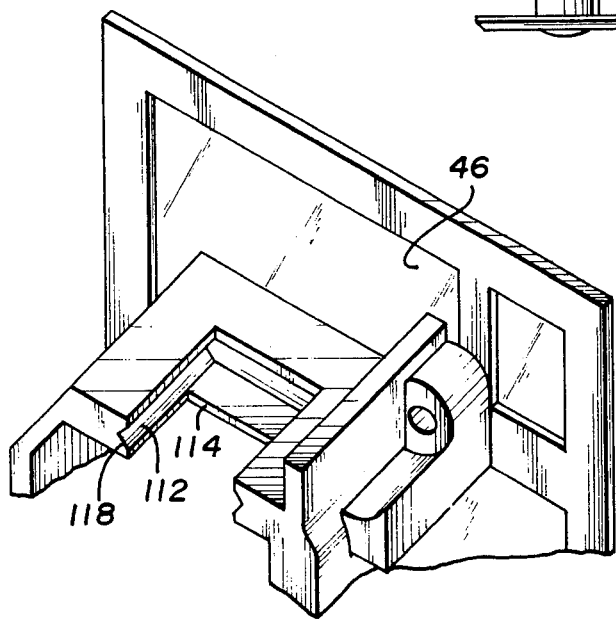
FIG. 13 is a fragmentary perspective view, showing the cable entry way portion of the device of FIG. 1.
Figure 20:
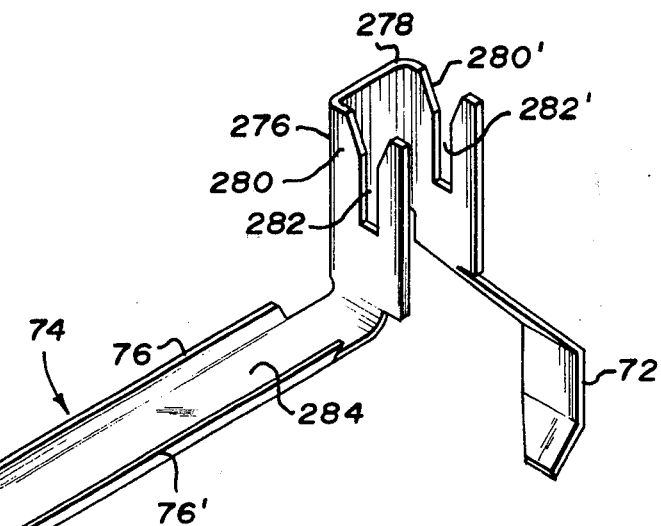
FIG. 20 is a perspective view of the ground conductor contact means for an electrical receptacle constructed in accordance with the concepts of the invention.

Turning now to FIGS. 1, 2, 3, 4, 5, 8, 9, 10, 11, 12, 13, 25, 26, 27, 32, and 33 there is shown an electrical receptacle 40 constructed in accordance with the concepts of the invention. The receptacle 40 comprises a body member 42 which may be conveniently molded from preferably rigid plastic material and which includes a base portion 44 having a flanged portion 46 surrounding the body member 42 and extending beyond the periphery thereof. The body member 42 comprises a box-like structure formed from a plurality of upstanding wall portions including a pair of sidewalls 48, 48' and a pair of end walls 50, 50' (FIG. 4). The interior of the sidewalls 48 and 48' and the end walls 50, and 50' combine to define a cable receiving cavity 52 which will be described in greater detail hereafter. As shown in greater detail in FIG. 4, the interior of the body member 42 comprises a series of aligned contact supports 54, 54', 56, 56' and 58, 58' which comprise selectively shaped upstanding portions affixed to the base portion 44 of the body member 42 and preferably molded integrally therewith. The contact supports 54, 54' and 58 form a nest for a first contact means 60 while the contact supports 56, 56' and 58' form a nest for a second contact means 62. Each of the supports 54, 54', 56, and 56' border a respective aperture 64, 64', 66, 66' extending generally transversely through the base member 44 and proportioned to receive the blades of an electrical plug which are guided through the aforesaid apertures or openings in the base portion 44 for contact with selective portions of the first and second contact means 60 and 62, respectively. As further illustrated in FIG. 2, the base member 44 is provided with additional openings 68, 68' adapted to receive the ground pin or blade of a conventional electrical plug. The openings 68, 68' coincide with respective contact engaging finger portions 70 and 72 of a ground conductor contact means 74 shown in greater detail in FIG. 20 and which will be described in greater detail hereafter. The contact means 74 is supported within the cable receiving cavity 52 of the body member 42 by a series of further support means 75, 75' and 76, 76' the inner surfaces of which define a channel arranged to tightly abut the sides of the contact means 74 to retain the contact means 74 in the desired position within the body member 42. To provide a complete enclosure, there is provided a cover member 78 having latch portions 80 and 80' (FIG. 8) adapted to mate with corresponding latch engaging protrusions 82 and 82' (FIG. 4) selectively located on the first and second sidewalls 48 and 48', respectively, of body member 42. Each of the latch portions 80 and 80' extend from the sides of the cover member 78 generally normal to the inner surface thereof and are spaced apart from one another a distance generally equivalent to the spacing between the outer surfaces of the sidewalls 48 and 48' of the body member 42. The latch portions 80 and 80' each comprise a pair of generally parallel spaced leg portions 84, 84' and 86, 86' respectively, each of which is joined to the cover member 78 at one end, the juncture between the cover member 78 and each of the latch portions 80 and 80' being further defined by a respective recessed portion 88, 88' arranged to increase the deflectability of each of the latch portions 80 and 80' at its juncture with the cover member 78. Each of the latch portions 80 and 80' further comprises an interconnecting portion 90, 90', respectively, joining a pair of respective leg portions 84, 86 and 84', 86' at their outer ends to complete the latch portion structure. The inner edges of the leg portions 84 and 86 and the interconnecting portions 90 of latch portion 80 define a first aperture 92, while the inner edges of the leg portions 84' and 86' and the interconnecting portion 90' of latch portion 80' define a second aperture 92' each suitably dimensioned to lockingly mate with the respective latch engaging protrusions 82 and 82' on the body member 42. The interconnecting portions 90 and 90' are further provided with a beveled interior surface 94, 94' generally adjacent the leading edge of each of the latch portions 80 and 80', only one (94') of such surfaces being visible in FIG. 8. The beveled surfaces 94, 94' serve to deflect each of the latch portions 80 and 80' outwardly upon engagement with a respective latch engaging protrusion 82, 82' as the cover member 78 is urged over the body member 42, so that upon full closure of the cover member 78 the inner edge 96, 96' of each latch portion 80, 80', respectively, abuts the adjacent edge of a latch engaging protrusion 82, 82', to securely lock the cover member 78 to the body member 42. The cover member 78, may, of course, be readily moved from the body member 42 by manually deflecting each of the latch portions 80 and 80' outwardly sufficiently to disengage the edges 96 and 96' from the latch engaging protrusions 82 and 82'. Alternatively, although not illustrated, the cover member 78 may be provided with latch engaging protrusions such as 82, 82', and the body member 42 provided with latch portions such as 80, 80' to provide a similar but reversed latch arrangement. Depending outwardly from the first sidewall 48 of body member 42, are a first pair of ribs 98, 98' (FIG. 4) arranged to provide a guide channel for the latch portion 80. In a similar manner the second sidewall 48' is provided with a pair of depending ribs 100, 100' to provide a guide channel for the latch portion 80'. Where it is desired to selectively orient the cover member 78 on the body member 42 the width of the latch portion 80 may be arranged to have a dimension different than the width of the latch portion 80' and the inner space between ribs 98, 98' and ribs 100, 100' correspondingly arranged to closely approximate the width of the corresponding latch portion 80, 80', thus insuring that the cover member 78 may be latched to the body member 42 in the desired orientation. Alternatively, although not illustrated, each of the latch portions 80, 80' may be provided with longitudinally extending ribs and the sidewalls 48, 48' of the body member 42, provided with mating suitably located recesses to provide a similar guiding and channelling effect. Each of the end walls 50 and 50' of the body member 42 is provided with a respective notched portion 102 and 102' arranged to provide clearance for the incoming electrical cable. The cover member 78 is provided with an upstanding portion 104 which, although shown adjacent only one end of the the cover member 78 in FIG. 8 may be provided at both ends in a similar manner and arranged to fit closely within a respective one of the notched portion 102, and 102' in the body member 42 thus providing a selective closure for the unused cable entryway essentially as shown in FIG. 12 where, for example, an electrical cable terminates at the electrical receptacle 40. The upstanding portion 104 is frangibly connected to the remainder of the cover member 78 by a relatively thin web of reduced cross section indicated by the numeral 106 in FIG. 11 to permit the upstanding portion 104 to be readily broken away from the remainder of the cover member 78 to provide an entryway for a cable at either end of the receptacle 40. This arrangement has the additional advantage of permitting a cable such as 108 (FIG. 10) to be terminated to the electrical receptacle 40 midspan of its length where the ends of the cable 108 are to extend beyond both ends of the body member 42. In the case of a single ended termination, as shown in FIG. 9, the upstanding portion 104 has been left intact at one end of the cover member 78 but has been broken away from the other end so as to permit an electrical cable such as 110 to be brought into and terminated at the receptacle 40 from only one end. Where it is desired to provide an entryway for more than one cable at a given end of the body member 42, there may be advantageously provided an arrangement such as that illustrated in FIG. 13, in which either or both of the notched portions 102 and 102' may be modified as at 112 to include a frangible portion 114 disposed within the notched portion 112 which, incidently, has a total depth greater than that required to provide an entryway for a single electrical cable, but is appropriately reduced by the height of the frangible portion 114. Consequently, in the event more than one electrical cable is to be inserted within the electrical receptacle 40 from a given end, the frangible portion 114 may then be broken away from the remainder of the notched portion 112 to provide an enlarged opening adapted to receive the additional cables therethrough. Commensurate with the embodiment illustrated in FIG. 13, the upstanding portion 104 of cover member 78 will have a depth generally equivalent to the unobstructed opening of the notched portion 112 so that a complete closure may be effected at such end prior to the removal of the frangible portion 114. The body member 48 may, accordingly, be provided with a notched portion such as 112 within either or both of the end walls thereof as necessary or desirable. As further illustrated in FIG. 8, the upstanding portion 104 of cover member 78 may be provided with a bevelled edge 116 arranged to be slidably engaged within a complimentarily formed slot 118 in either the notched portion 112 (FIG. 13) or 102 and 102' (FIG. 4) to provide an increased area of closure therebetween. The cover member 78 is further provided with cable guides 120 and 120' (FIG. 8) each of which includes a respective pair of upstanding leg portions 122, 122' and 124, 124', each pair at least partially defining a channel like opening to restrict lateral movement of an electrical cable such as 108 or 110 within the cover member 78 during and after assembly. Each pair of leg portions 122, 122' and 124, 124' are joined at their respective bases by an interconnecting portion 126, 126', respectively, adapted to maintain the cable at a given height above the inner surface of the cover member 78. Also depending outwardly generally normal to the interior surface of the cover member 78 are a series of projections aligned in rows which are axially oriented generally parallel to the longitudinal axis of the cover member 78. One such row includes projections 128, 130, and 132. Another such row includes projections 134, 136, and 138. Between the aforementioned two rows is a third row including projections 140, 142, 146 and 148, projections 146 and 148 differing, however, from projections 140 and 142 in providing a guide rather than a support, for the centrally disposed conductor. The cable guides 126 and 126' are disposed along a common axis in general alignment with an axis joining the projections 140, 142, 146, and 148. All of the aforementioned projections except projections 146 and 148 are provided with a bifurcated free end which, as illustrated in FIG. 8, may comprise a V-shaped notch such as indicated by the numeral 150 at the free end of projection 128. The apex of the notches in a particular row of projections lie along a common axis generally parallel to the longitudinal axis of the cover member 78 to provide a cradle for a particular individual conductor of a multiconductor electrical cable in the manner illustrated in FIGS. 9 and 10. In the arrangement illustrated therein, the two outer rows comprising, respectively, projections 128, 130 and 132, and projections 134, 136 and 138, are adapted to support the usual current-carrying conductors of a multiconductor electrical cable while the center row comprising projections 140, 142, 146, and 148 are adapted to support the usual ground conductor of such cable. The V-notched projections are all of equal height and positionally arranged to insure that each of the conductors supported thereby will be aligned with a respective conductor receiving portion of an associated contact means 60, 62, and 74 located within the body member 42 of the receptacle 40 as the cover member 78 is brought into engagement with the body member 42. As the cover member 78 is urged into full latched engagement with the body member 42 in the manner illustrated in FIG. 11, the conductors which are cradled within the bifurcated free ends of the projections in the cover member 78 are, accordingly, urged against the respective conductor receiving portions of the contact means 60, 62, and 74 for electrical and mechanical engagement therewith. After assembly, the cover member projections serve as a strain relief by locking the conductors in place adjacent the respective contact means.

Figure 29:
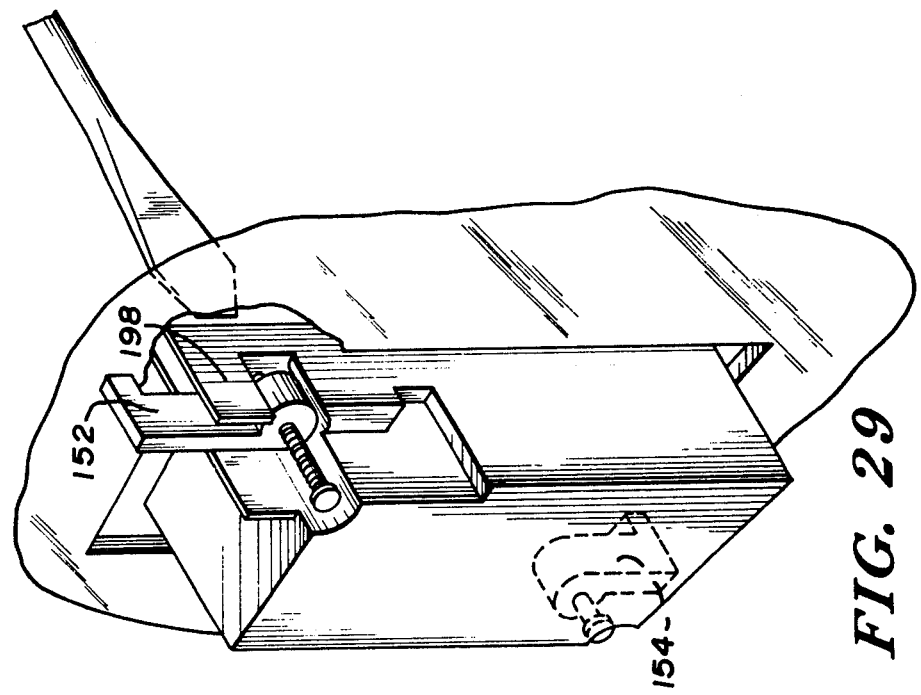
FIG. 29 is a perspective view of the device of FIG. 28 fully deployed.
Figure 28:
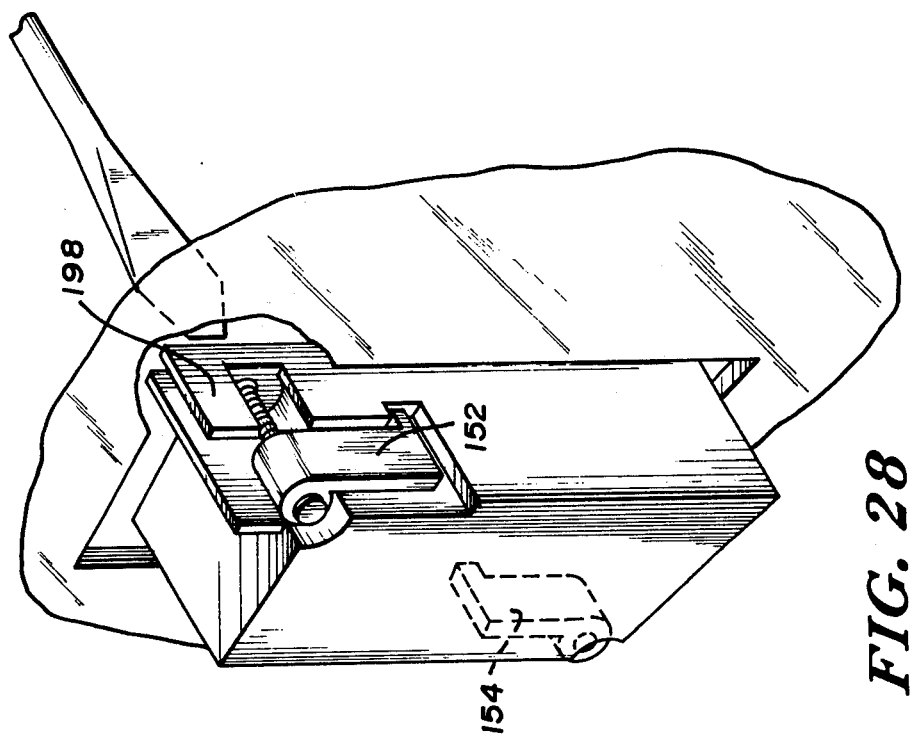
FIG. 28 is a perspective view of a further embodiment of mounting means for an electrical receptacle constructed in accordance with the concepts of the invention.
Figure 31:
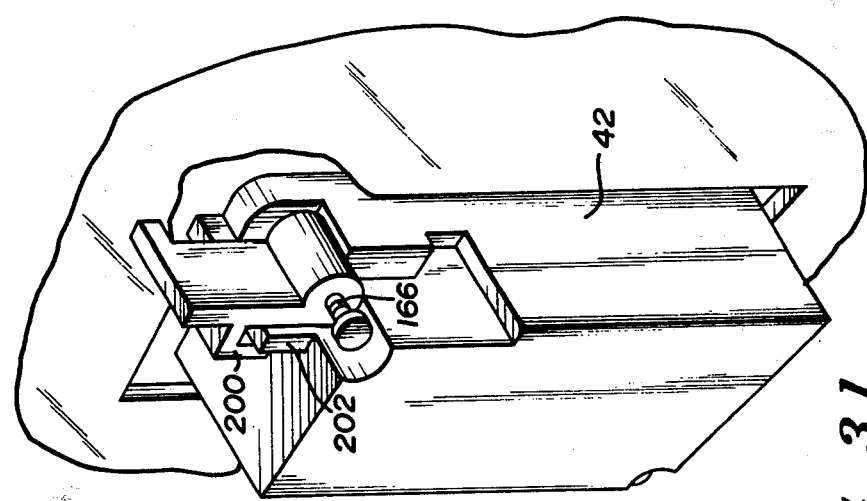
FIG. 31 is a perspective view of the device of FIG. 30 fully deployed.
Figure 30:
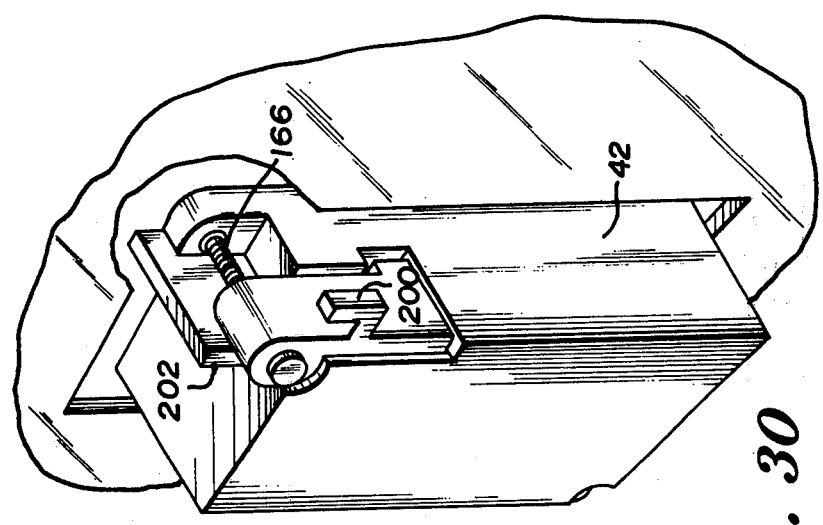
FIG. 30 is a perspective view of another embodiment of mounting means for an electrical receptacle constructed in accordance with the concepts of the invention.

The electrical receptacle 40 may be mounted to a suitably apertured supporting surface by the employment of mounting means such as pawl means 152 and 154 (FIG. 3, 25 and 26) each of which comprises a hub portion 156, 158, respectively, and a finger portion 160, 162, respectively, each finger portion 160, 162 extending radially outwardly from its associated hub portion. Both pawl means 152 and 154 are similarly constructed and further comprise a gusset portion such as 164 (FIG. 1) extending between the hub portion and finger portion at each pawl means. Each of the hub portions 156 and 158 have a longitudinal bore extending therethrough for threaded engagement with the shank portion of a respective screw means 166 and 168, the shank portions of which extend generally transversely through the flanged portion 46 of the base portion 44 of the body member 42. Each of the screw means 166 and 168 includes a head portion 170, 172, respectively, (FIG. 2) which is accessible from the front surface of the flanged portion 46 so that upon rotation of the screw means 166 and 168, the respective pawl means 152 and 154 are caused to be deployed and axially displaced in a manner shown more clearly in FIG. 25 and 26. The body member 42 is provided with a pair of pawl stops 174 and 176 (FIG. 3) each arranged to limit the rotational travel of a respective pawl means 152, 154 as shown in FIG. 27. The pawl stops 174 and 176 extend generally parallel to the axis of a respective screw means 166 and 168 generally normal to the plane of the base portion 44 of the body member 42 and are arranged to intercept the arc of a respective finger portion 160, 162 of a pawl means 152, 154. Accordingly, the pawl means 152 and 154 may be deployed from a first position closely adjacent and within the periphery of the sidewalls 48 and 48' of the body member 42 (FIG. 3) to a second position substantially as shown by the dotted outlines 178 and 178' in FIG. 25 and by the solid outline in FIG. 27 by rotating each of the screw means 166 and 168 with the aid of a tool such as screw driver 180 (FIG. 25) in the direction shown by the arrows 182. As the finger portions 160 and 162 of the pawl means 152 and 154 contact a respective pawl stop 174, 176, further rotation of the pawl means is thus restrained and each of the pawl means 152 and 154 is caused to ride along the threaded portion of a respective screw means 166, 168 towards the flanged portion 46 of the base portion 44 in a direction indicated generally by the arrows 184 and 186 in FIG. 25. As each of the screw means 166 and 168 is further rotated, the associated pawl means finger portions 160 and 162 are caused to bear against the adjacent surface of a supporting wall 188, in a manner shown more clearly in FIG. 26. The wall 188 is thus sandwiched between a respective finger portion 160, 162 of the pawl means 152, 154, and the flanged portion 46 of the receptacle 40 to lock the receptacle 40 in the desired position within the supporting wall 188. The shank portion of each of the screw means 166 and 168 extends through the flanged portion 46 of the base portion 44 and into a respective supporting boss 190, 192 (FIG. 4). Extending rearwardly from each of the bosses 190, 192, is a channel 194 (FIG. 26) disposed adjacent the shank portion of each of the screw means 166 and 168 and having an interior surface arranged to provide a nest for an associated hub means 156, 158, of the pawl means 152, 154. Each of the channels 194 is further provided with a lip portion 196 illustrated more clearly in FIGS. 26 and 27. The channels 194 and the lip portions 196 are essentially of the same length and encompass a portion of the total axial distance transversed by the pawl means so that each of the finger portions 160 and 162 of the pawl means 152 and 154 may be rotated freely into their deployed position without interference from either the channel 194 or lip portion 196 at the initiation of the mounting operation. However, as the screw means 166 and 168 are rotated, each of the pawl means 152 and 154 is caused to advance forwardly axially along a respective threaded portion of the screw means 166 and 168 until each of the pawl means 152 and 154 has entered the area encompassed by the lip portion of an associated channel 194. In this position, the pawl means is partially restrained from rotating in a counterclockwise direction, as viewed from the front of the receptacle 40, beyond a position shown generally by the dotted outline 152 in FIG. 27 so that in the event of vibration or movement of the receptacle 40 the mounting pawls 152 and 154 are effectively restrained in their arcuate travel and are always at least partially deployed for engagement with the adjacent surface of the supporting wall 188. To remove the receptacle 40 from the supporting structure, each of the screw means 166 and 168 must be backed off sufficiently to cause an associated pawl means 152, 154 to be moved axially rearwardly sufficiently to cause an associated finger portion 160, 162 to traverse the entire length of an associated restraining lip 196 so that each of the pawl means may then be freely rotated back into its undeployed position essentially as shown in FIG. 3. A modified form of the lip portion 196 is illustrated in FIGS. 28 and 29 and includes an upstanding finger 198 which functions both as a restraining means and guide means for each of the pawl means 152 and 154. A further embodiment of a rotational restraining means is shown in FIGS. 30 and 31 wherein each of the pawl means is provided with a hook-like extension 200 extending outwardly from its finger portion and arranged to overlie an upstanding rib portion 202 located on the body member 42 and extending generally parallel to the axis of an associated screw means 166 and 168. Thus, in the undeployed state, the pawl means and its associated hook-like extension 200 are positioned essentially as shown in FIG. 30. After deployment, as shown in FIG. 31, the hook-like extension 200 is caused to be engaged about the rib portion 202 which both guides and supports the pawl means as it is advanced towards the flanged portion 46 of the base portion 44.

Figure 16:
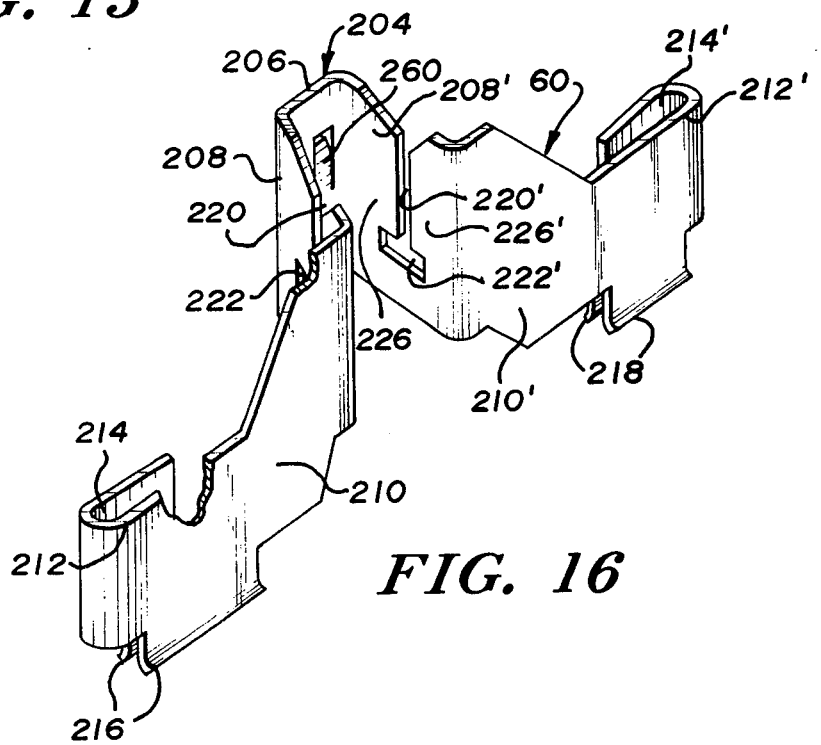
FIG. 16 is a perspective view, partly cut away and partly in section, of the device of FIG. 14.
Figure 14:
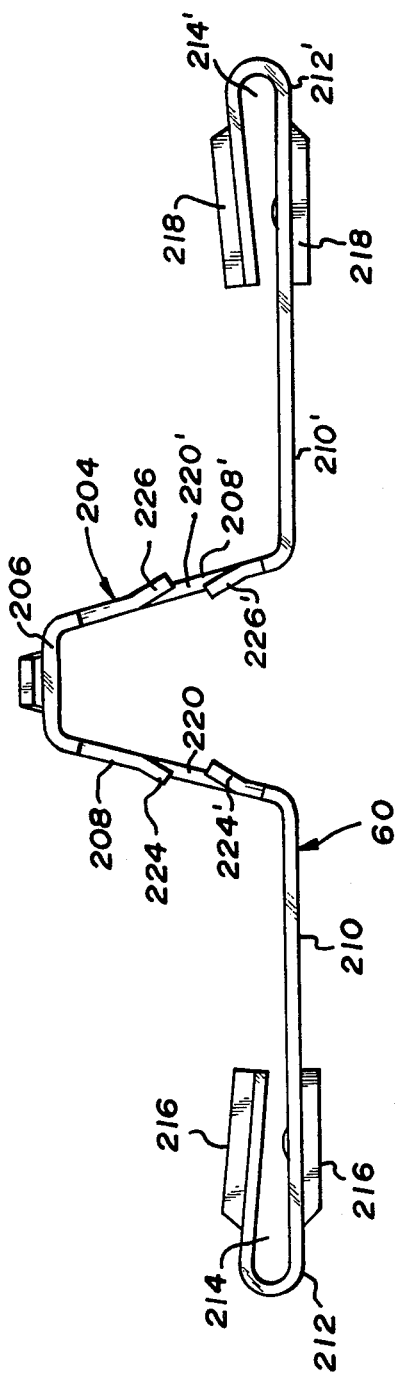
FIG. 14 is a top plan view of contact means for an electrical receptacle constructed in accordance with the concepts of the invention.
Figure 17:
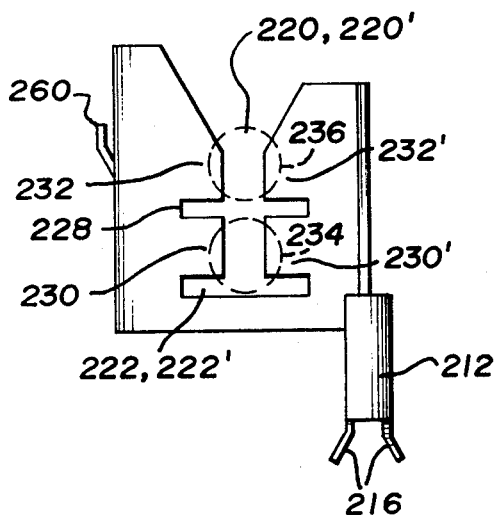
FIG. 17 is a side elevational view of a further embodiment of the conductor receiving portion of a contact means for an electrical receptacle constructed in accordance with the concepts of the invention.
Figure 18:
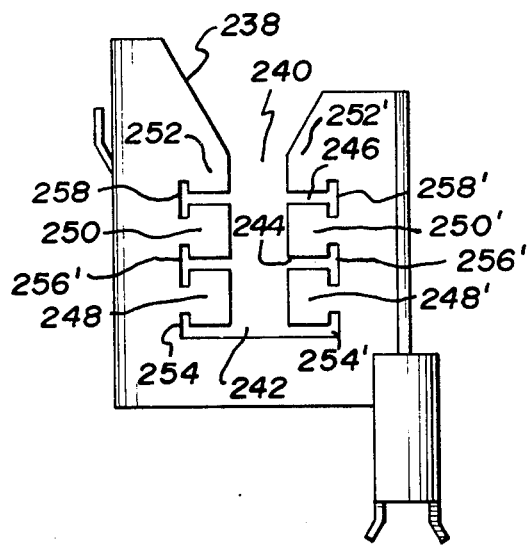
FIG. 18 is a side elevational view of yet another embodiment of the conductor receiving portion of a contact means for an electrical receptacle constructed in accordance with the concepts of the invention.
Figure 19:
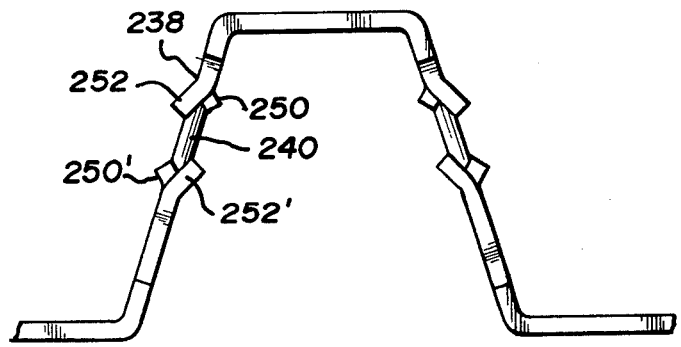
FIG. 19 is a fragmentary top plan view of yet another embodiment of the conductor receiving portion of a contact means for an electrical receptacle constructed in accordance with the concepts of the invention.

Turning now to FIGS. 14 and 16 the contact means 60 located within the body member 42 of the electrical receptacle 40 is shown in further detail. Since the contact means 62 is essentially identical to the contact means 60 but is formed as a mirror image thereof, all reference to the contact means 60 will be deemed to include a similar but complimentary structure with regard to the contact means 62. The contact means 60 may be conveniently manufactured preferably from a single strip of highly conductive metallic material such as, brass, copper, or other well known conductive materials and includes a generally U-shaped conductor engaging central portion 204 having a bight portion 206 and extending leg portions 208 and 208'. The free end of each of the leg portions 208 and 208' is joined to a respective arm portion 210, 210' disposed substantially at right angles to the plane of a respective leg portion 208, 208', said arm portions lying in a common plane. Each of the arm portions 210 and 210' terminates in a respective looped portion 212, 212' of generally flattened configuration so as to provide a respective tab receiving slot 214, 214' oriented in generally parallel relationship with the plane of an associated arm portion 210, 210', each of the tab receiving slots 214, 214' being arranged to slidably receive the blade of a common electrical plug. The gap between the opposing wall surfaces forming the tab receiving slot 214, 214' is selectively dimensioned to provide a relatively tight fit about such blade to insure secure and reliable electrical and mechanical contact therebetween. Each looped portion, 212, 212', is provided with outwardly flared extending portions 216, 218, respectively, for partially guiding an associated blade of an electrical plug into a respective tab receiving slot 214, 214'. Each of the leg portions 208, and 208' of the contact means 60 is provided with a first slot 220, 220' (FIG. 16) extending a given length generally parallel to the axis of the bight portion 206 of the central portion 204, each of the first slots 220 and 220' terminating at a second slot 222, 222', respectively, axially oriented generally normal to the axis of its respective first slot 220, 220' to define a generally inverted T-shape. The first and second slots of each leg portion 208, 208', thus define a pair of opposingly disposed finger portions 224, 224', and 226, 226', respectively, each of the finger portions being independently deflectable and having a free edge arranged to sever the insulation about and engage the conducting portion of an insulated conductor forcibly thereinto. As further illustrated in FIG. 14, the finger portions 224, 224' are offset from one another in opposite directions from the plane of their associated leg portion 208, and the finger portions 226, 226' are offset from one another in opposite directions from the plane of their associated leg portion 208', so that each of the finger portions of a pair such as 224 and 224' will be deflected away from one another in opposite directions when subjected to the force of, for example, an electrical conductor urged between the finger portions and having a diameter slightly greater than the width of the respective slot 220. The finger portions 224, 224', will of course, tend to return to their original undeflected position, thereby maintaining tight electrical and mechanical engagement with the engaged portion of the electrical conductor. An identical situation occurs with respect to the finger portions 226, 226' which are formed in essentially the same manner as the finger portions 224, 224'. Accordingly, a conductor spanning the U-shaped portion 204 of the contact means 60 generally parallel to the plane of the arm portions 210, 210' is securely held between the two pair of finger portions and is thereby electrically joined to the remainder of the contact means 60. Although the arrangement shown in FIG. 16 has been found to be entirely adequate in the case of a single conductor, a third slot 228 (FIG. 17) disposed intermediate the length of, and intersecting the first slot 220, 220', may be introduced into a respective leg portion 208, 208', to provide two pair of independently deflectable finger portions 230, 230', and 232, 232' located along the length of an associated slot 220, 220'. Accordingly, conductors of different diameters, which, by way of example, are illustrated by the dotted outlines 234, 236 in FIG. 17, may be forcibly urged into a respective slot 220, 220' in overlying relationship and independently engaged between an associated pair of finger portions, such as 230, 230' and 232, 232', to minimize the effect of deflection of one pair of finger portions upon the other pair. In this manner either the larger or smaller diameter conductor may be introduced first into the slots 220, 220' without effecting the electrical and mechanical integrity of the connection formed between both conductors and the contact means. In a similar manner, an additional slot may be provided along the length of the first slot 220, 220' in a manner illustrated, for example, in FIG. 18 where there is shown a conductor receiving leg portion 238 having a longitudinally disposed first slot 240 terminating at a second slot 242 and further intersected by additional slots 244 and 246 to provide three pair of individually deflectable fingers 248, 248', 250, 250', and 252, 252'. Each of the slots 242, 244, and 246 may further terminate at an additional slot such as indicated at 254, 254', 256, 256' and 258, 258', respectively, providing increased flexibility for each of the independently deflectable finger portions 248, 248' 250, 250', and 252, 252'. As further illustrated in FIG. 19 the finger portions located on one side of the slot 240 may be alternatingly offset from the plane of their associated leg portion 238, that is, the finger portion 252, as viewed in FIG. 19, is offset to the left of the plane of the leg portion 238 while the finger portion 250 is offset to the right of the plane of the leg portion 238 and, accordingly, the finger portion 248 may be offset in the same direction as the finger portion 252. The alternating offset arrangement described hereinabove may, of course, be modified so that each of the finger portions, such as 248, 250, and 252 located on one side of the slot 240 may be offset in the same direction from the plane of their associated leg portion 238 while the finger portions 248', 250, and 252' located on the other side of the slot 240 may be offset in the opposite direction from the plane of their associated leg portion 238. It has been found, however, that an alternating offset arrangement provides a slightly better distribution of forces along one side of the slot 240 where a plurality of conductors are disposed in overlying relationship within the slot 240. The bight portion 206 of the U-shaped portion 204 of the contact means 60 is further provided with a lanced projection 260 (FIG. 16) extending outwardly from the rear surface of the bight portion 206 for engagement with the adjacent wall surface of the contact support within the body member 42 to lock the contact means 60 in a given position within the body member 42.

Figure 6:
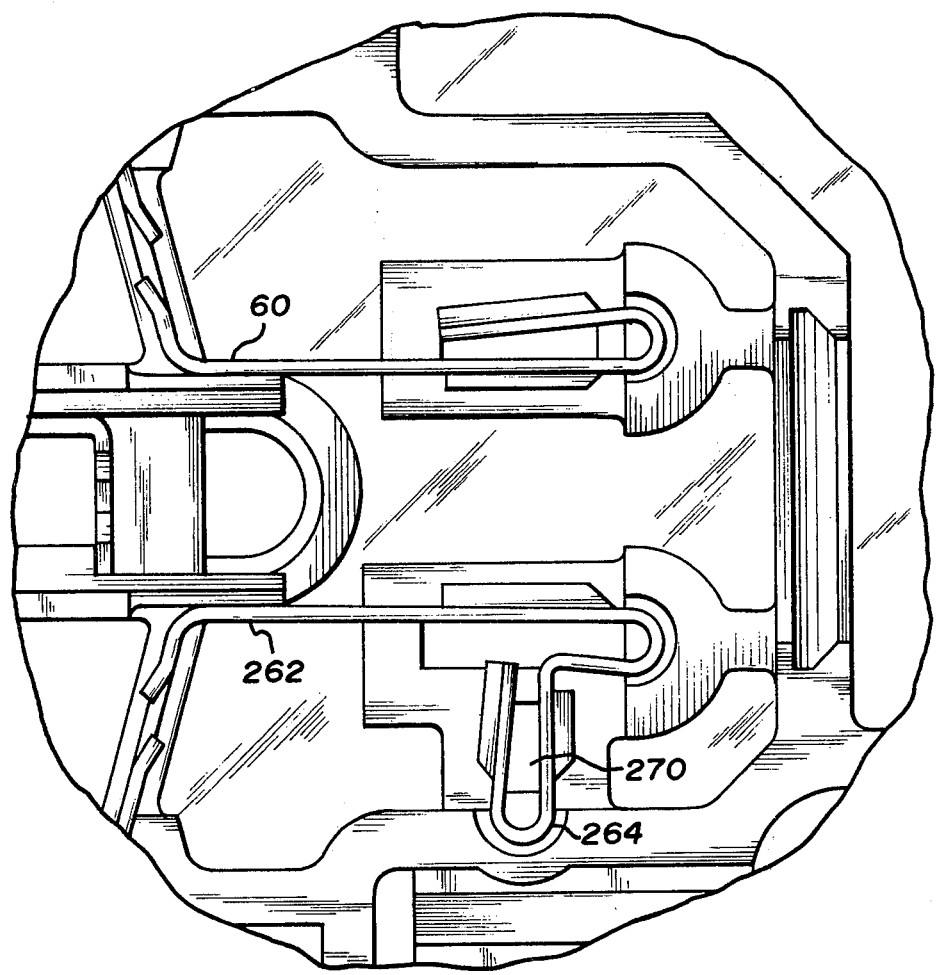
FIG. 6 is a fragmentary top plan view of a further embodiment of a contact means for an electrical receptacle constructed in accordance with the concepts of the invention.
Figure 7:
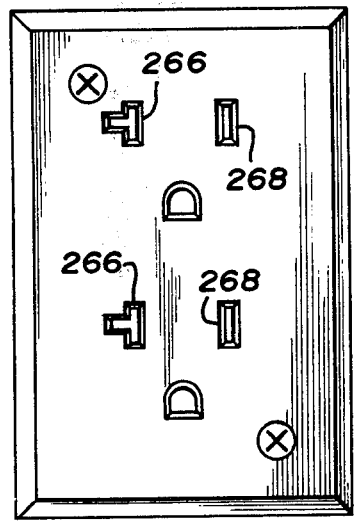
FIG. 7 is a front elevational view of a further embodiment of an electrical receptacle constructed in accordance with the concepts of the invention.
Figure 15:
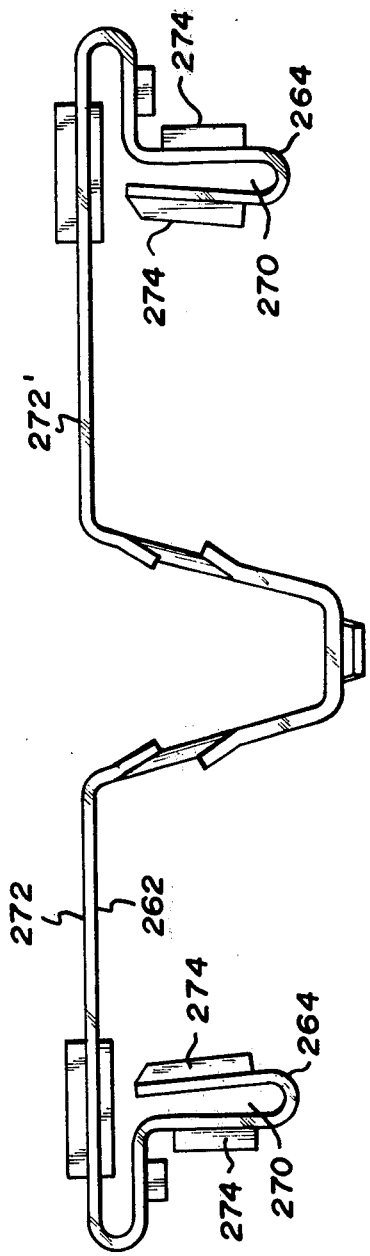
FIG. 15 is a top plan view of a further embodiment of contact means for an electrical receptacle constructed in accordance with the concepts of the invention.
Figure 21:
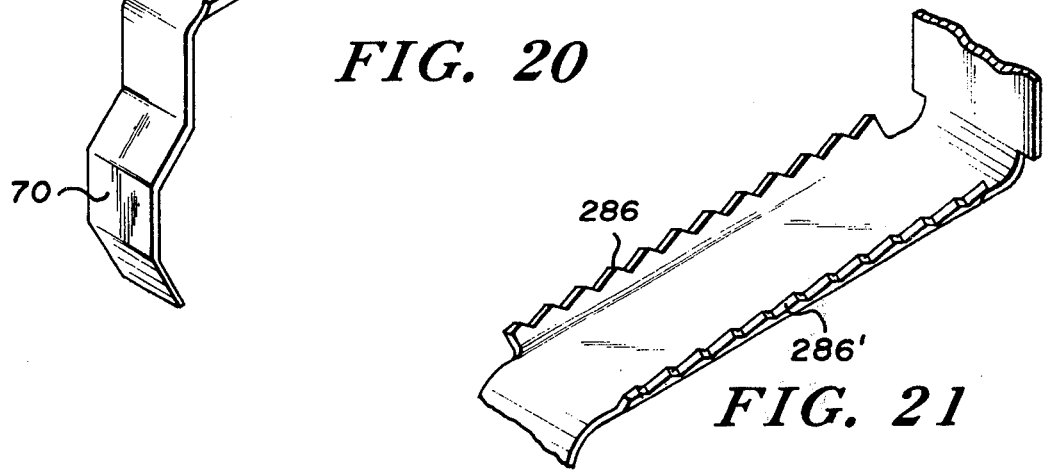
FIG. 21 is a fragmentary perspective view, partly in section, of a further embodiment of a ground conductor receiving contact means for an electrical receptacle constructed in accordance with the concepts of the invention.

Turning now to FIGS. 6 and 15, either or both of the contact means 60 and 62 may be modified to provide a contact means 262 essentially similar to either of said contact means 60 or 62 but further provided with an additional looped portion such as 264 disposed generally normal to a respective looped portion 212, 212' described heretofore. To facilitate the employment of the arrangement shown in FIG. 6, the base portion of the receptacle is modified essentially as shown in FIG. 7 to provide a T-shaped slot 266 arranged to coincide with one end of the contact means 262, and a rectangular slot 268 essentially duplicative of slots 64, 64' illustrated in FIG. 2, and similarly arranged to coincide with a respective looped end of the contact means 60. The additional looped portion 264 is also provided with a flattened configuration to define a tab receiving slot 270 planarly oriented generally perpendicular to the plane of the tab receiving slot 214' of contact means 60 to provide a socket arrangement adapted to receive both 120 V.A.C. and 220 V.A.C. electrical plugs, where necessary or desirable. For duplex operation, both ends of the contact means 262 may be provided with an additional looped portion 264 (FIG. 15), each disposed adjacent the terminating end of a respective arm portion 272, 272'. The additional looped portions 264 are also provided with outwardly flared extending portions 274 similar to the flared portions 216 and 218 illustrated in FIGS. 16 and 17 and function in a similar manner in providing a guide for the respective plug blades inserted therewithin. The contact means 60 and 62 and the contact means 262 are designed primarily to provide an interconnection between the conventional current-carrying conductors of an incoming electrical cable and the blades of an electrical plug inserted within the receptacle. The ground contact means 74 shown in plan view in FIG. 4 is illustrated in greater detail in FIG. 20 and is also preferably manufactured from a single strip of highly conductive metallic material suitably formed to provide a generally U-shaped conductor receiving portion 276 having a bight portion 278 and extending leg portions 280 and 280'. The leg portions 280 and 280' are slotted as at 282, 282', respectively, to provide a conductor receiving channel for the ground conductor of a multiconductor electrical cable such as described heretofore. Extending from the free end of the leg portion 280 in generally normal planar relationship therewith is a channel-like arm portion 284 from which depends the first finger portion 70, while the second finger portion 72 extends from one edge of the remaining leg portion 280' and is formed essentially as a mirror image of the first finger portion 70. The finger portions 70 and 72 of contact means 74 are arranged to coincide with the apertures 68 and 68', respectively, in the base portion 44 of the body member 42 so as to bear against the respective ground pin of an electrical plug inserted within the corresponding apertures 68, 68' in the base portion 44. The longitudinally extending upturned edges 76, 76' of the arm portion 284 of the contact means 74 are arranged to engage the adjacent wall portions of the contact support means 75, 75' (FIG. 4) within the body member 42 of the receptacle 40 to maintain the contact means 74 in a given position between the contact means 60 and 62. The edges 76 and 76' may be serrated as shown at 286, 286' in FIG. 21 to increase the interengagement between such edges and the adjacent wall of the contact supports in the body member 42. The arm portion 284 of the ground contact means 74 is further supported on struts 288, 288' (FIG. 22) extending upwardly from the base portion 44 of the body member 42, intermediate the contact support means 75, 75' (FIG. 4).

Figure 24:
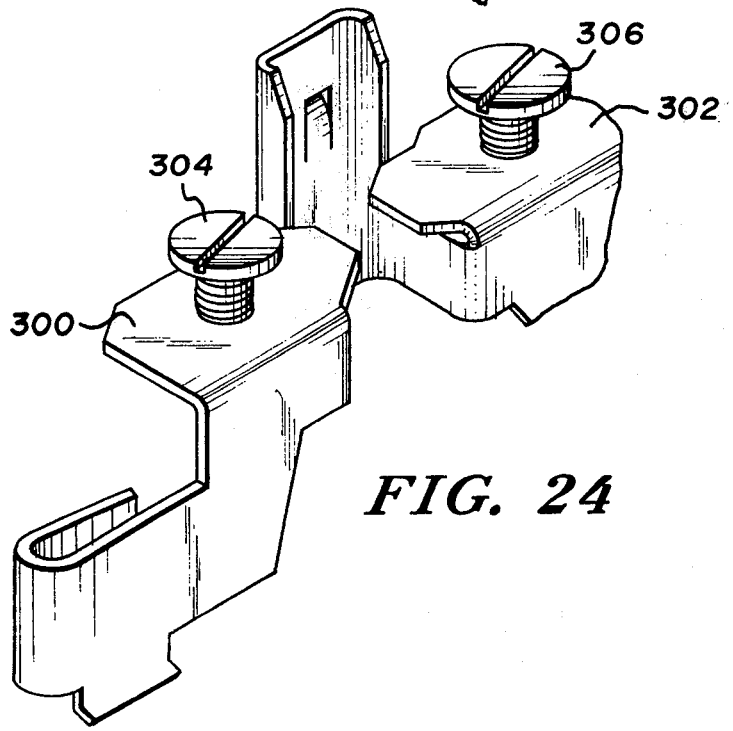
FIG. 24 is a fragmentary perspective view of a further embodiment of contact means for an electrical receptacle constructed in accordance with the concepts of the invention.

Turning now to FIGS. 23 and 24, the conductor receiving slots in each of the contact means 60 and 62 and the ground conductor contact means 74 may be eliminated, and an arrangement similar to that illustrated in FIGS. 23 and 24 substituted therefore. In FIG. 23, there is shown a portion of a ground conductor contact means 290 having outwardly extending flanged portions 292 and 294 each suitably apertured to receive an associated threaded member such as a screw 296, 298 which may be tightened about the bared looped end of a conductor (not shown) to electrically and mechanically connect the conductor to the contact means 290. The contact means 60 and 62 may be similarly modified as shown for example in FIG. 24. As illustrated therein, each of the arm portions may be provided with an associated overhanging flanged portion 300, 302, suitably apertured to receive a threaded member such as a screw 304, 306 which may similarly be tightened about the bared looped end of an electrical conductor for electrical and mechanical engagement therewith.

Figure 32:
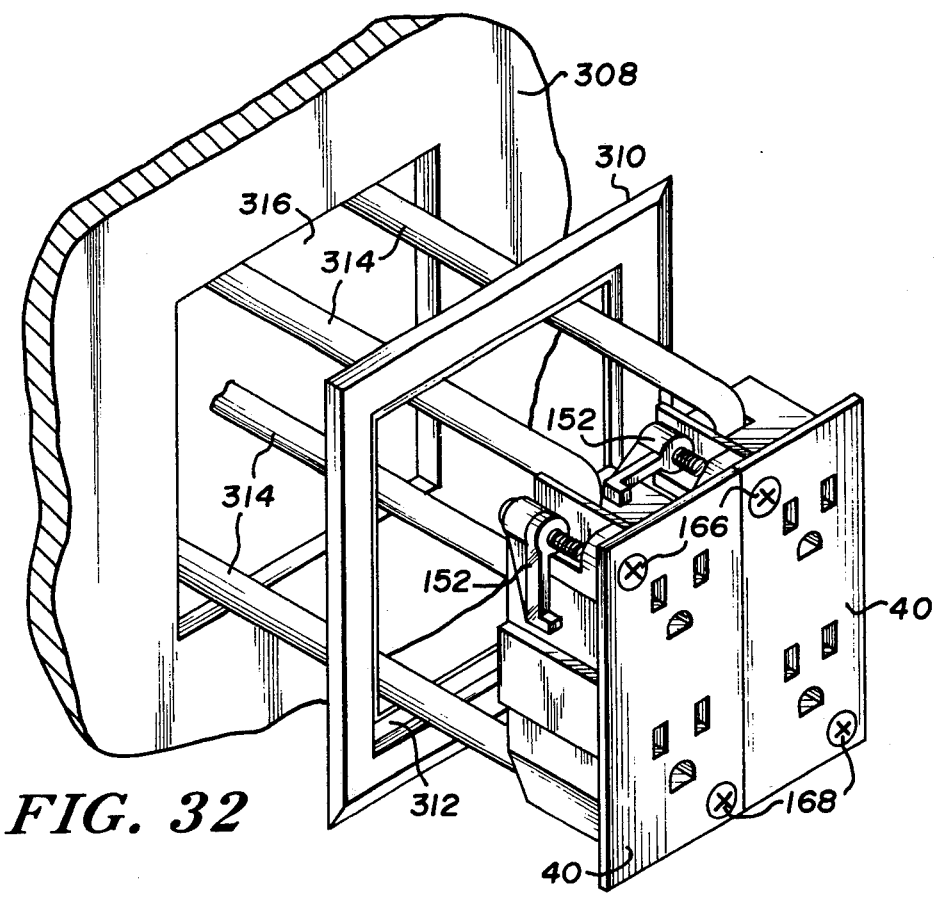
FIG. 32 is a perspective view of a ganged receptacle assembly constructed in accordance with the concepts of the invention.
Figure 33:
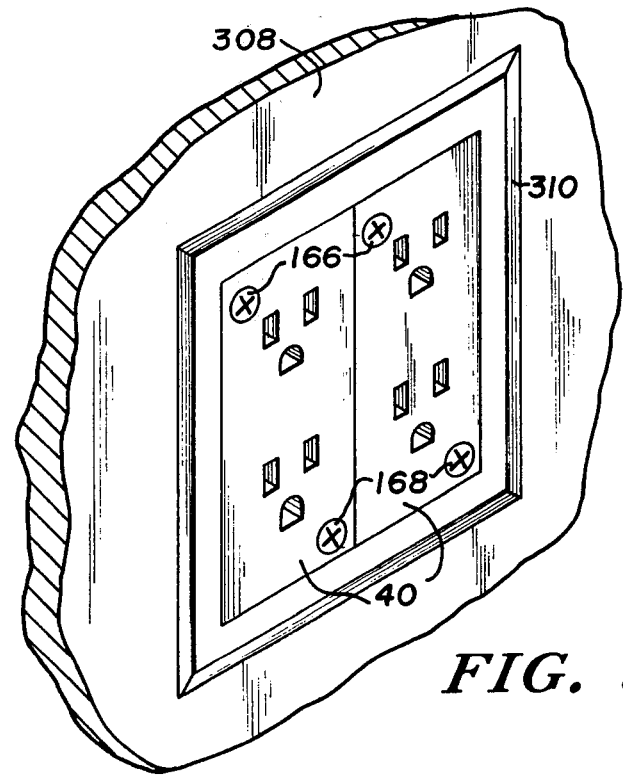
FIG. 33 is a perspective view of the arrangement shown in FIG. 32 installed within a supporting wall.

Turning now to FIGS. 32 and 33, two or more electrical receptacles 40 may be mounted in side by side relationship in a supporting wall such as 308 by the employment of a suitably dimensioned frame 310 the inner periphery of which is recessed as at 312 to provide a supporting step for the peripheral edge of the flanged portions of each of the receptacles 40. To initiate the installation, one or more electrical cables such as 314 are first fed through a suitably proportioned aperture 316 in the supporting wall 308 and through the frame 310 for attachment to each of the receptacles 40. The receptacles 40 are then placed against the recess 312 of the frame 310 in juxtaposed relationship and the partial assembly including the receptacles 40 and the frame 310 positioned against the aperture 316 in the supporting wall 308. The mounting pawls 152 and 154 may now be deployed by rotating the screws 166 and 168, as described hereinabove, so that the finger portions thereof are caused to rotate outwardly and advance forwardly against the rear surface of the supporting wall 308, thereby providing a completed installation essentially as shown in FIG. 33. It will of course be readily appreciated that, due to the nature of the assembly, extreme care in forming the aperture 316 is not required since the frame 310 and the electrical receptacles 40 comprise essentially a self-contained unit which may be relatively freely manipulated both vertically and horizontally within the dimensions of the aperture 316 prior to deploying and advancing the mounting pawls 152 and 154. It will also be appreciated that although two such electrical receptacles 40 are shown in the assembly illustrated in FIG. 33, almost any number may be cooperatively joined in a similar manner without departing from the spirit of the invention and within the concepts herein disclosed.

The embodiments of the invention in which an exclusive property or privilege is claimed are defined as follows:

I claim:

1. Mounting means for an electrical receptacle having an enclosed body member, a base portion integrally joined to said body member and having a flanged portion extending beyond the periphery of said body member, said mounting means comprising: pawl means rotatably connected to said flanged portion and having a finger portion movable from a first position within the confines of the outer periphery of said body member to a second position beyond the confines of the outer periphery of said body member; means for rotatably deploying said pawl means finger portion from said first position to said second position; means for displacing said pawl means along an axis generally normal to the plane of said base member flanged portion adjacent said body member; and means for selectively restraining the rotational movement of said pawl means along a given portion of its length of axial displacement, said restraining means comprising a first planar pawl stop and a second planar pawl stop, said first pawl stop extending rearwardly from said base member flanged portion parallel to the path of axial displacement of said pawl means finger portion for stopping said pawl means in said second position, said second pawl stop being shorter than said first pawl stop and extending rearwardly from said base member flanged portion generally parallel to a portion of the path of axial displacement of said pawl means finger portion and lying in a plane generally parallel to and spaced from the plane of said first pawl stop to provide a channel-like passageway for said pawl means finger portion along a portion of the path of axial displacement of said pawl means finger portion.

2. Mounting means as defined in claim 1 wherein said pawl means comprises a generally cylindrical hub portion having an aperture extending longitudinally therethrough, said means for rotatably deploying said pawl means and said means for axially displacing said pawl means comprising screw means having a shank portion extending through said base portion flanged portion and threadably engaged within said pawl means hub portion aperture, said screw means having a head portion accessible from the surface of said flanged portion opposite said body member wherein, upon the selective rotation of said screw means in a first direction, said pawl means is caused to be rotatably deployed from its said first position to its said second position and is further caused to be axially displaced towards said flanged portion.

* * * * *